United States Patent
Lyu et al.

(10) Patent No.: US 12,265,800 B2
(45) Date of Patent: Apr. 1, 2025

(54) MULTICELL DOCUMENT EDITOR MINIMOREMAP

(71) Applicant: Microsoft Technology Licensing, LLC, Redmond, WA (US)

(72) Inventors: Peng Lyu, Sammamish, WA (US); Kai-Uwe Maetzel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 17/987,353

(22) Filed: Nov. 15, 2022

(65) Prior Publication Data

US 2024/0160416 A1 May 16, 2024

(51) Int. Cl.
 *G06F 9/44* (2018.01)
 *G06F 8/33* (2018.01)
(52) U.S. Cl.
 CPC ..................................... *G06F 8/33* (2013.01)
(58) Field of Classification Search
 None
 See application file for complete search history.

(56) References Cited

U.S. PATENT DOCUMENTS

| | | | | |
|---|---|---|---|---|
| 8,887,089 | B2* | 11/2014 | Cochrane | G06F 8/33 715/854 |
| 2008/0104535 | A1 | 5/2008 | Deline | |
| 2009/0235186 | A1* | 9/2009 | Howard | G06F 16/9577 715/760 |
| 2009/0287994 | A1* | 11/2009 | Ichino | G06F 40/143 715/234 |
| 2013/0151974 | A1* | 6/2013 | Cho | G06F 40/137 715/799 |
| 2014/0365886 | A1 | 12/2014 | Koenig | |
| 2016/0239509 | A1* | 8/2016 | Ahuja | G06F 16/14 |
| 2018/0052891 | A1* | 2/2018 | Shuster | G06F 9/30043 |

(Continued)

OTHER PUBLICATIONS

Sergey Titov et al., "Respit: Improving the Structure of Jupyter Notebooks by Re-Splitting Their Cells", Mar. 2022 (Year: 2022).*

(Continued)

*Primary Examiner* — Bradley A Teets
*Assistant Examiner* — Lanny N Ung
(74) *Attorney, Agent, or Firm* — Ogilvie Law Firm

(57) ABSTRACT

Some embodiments provide a notebook tool enhanced with minimoremap functionality. Notebooks are multicell documents with varied mime types present in the content of various cells of a given notebook, including executable source code such as scripts, non-executable content, markdown text, natural language text, photos, videos, maps, and more. The notebook tool includes a main view and a superimposed minimoremap view which is functionally coordinated with the main view, e.g., for navigation and cell selection. Notebook cell operations are commanded via the minimoremap. Cells outside the main view viewport are modified without changing the user interface main view focus. Tool-human interaction commands cause the performance of notebook operations such as cell execution, cell rearrangement, cell collapse, cells merge, cells grouping, or cell dependency analysis. Minimoremap cell images are rendered as icons, as graphics, or as scaled-down versions of previously rendered full-size main view images.

20 Claims, 6 Drawing Sheets

(56) References Cited

U.S. PATENT DOCUMENTS

| | | |
|---|---|---|
| 2020/0019384 A1 | 1/2020 | Lyu et al. |
| 2020/0050431 A1 | 2/2020 | Zilouchian Moghaddam et al. |
| 2021/0319166 A1* | 10/2021 | Lyu .................. G06F 21/53 |
| 2023/0161945 A1* | 5/2023 | Vadapandeshwara ............... G06F 40/166 715/234 |

OTHER PUBLICATIONS

David Koop et al., "DataFlow Notebooks: Encoding and Tracking Dependencies of Cells", Jun. 2017 (Year: 2017).*

"User Interface", retrieved from << https://code.visualstudio.com/docs/getstarted/userinterface >>, no later than Oct. 14, 2022, 17 pages.

"What is this thing in xcode?", retrieved from << https://developer.apple.com/forums/thread/699771 >>, no later than Oct. 14, 2022, 3 pages.

Aasif Khan, "5 Quick Tips for the Xcode 11 Minimap", retrieved from << https://www.appypie.com/xcode-minimap >>, Dec. 27, 2021, 8 pages.

Rasmus, "Minimap", retrieved from << https://www.figma.com/community/plugin/772952119002135124/Minimap >>, Nov. 3, 2019, 3 pages.

"Page thumbnails and bookmarks in PDFs", retrieved from << https://helpx.adobe.com/acrobat/using/page-thumbnails-bookmarks-pdfs.html >>, Sep. 6, 2022, 14 pages.

Caty McCarthy, "20 Amazing In-Game Maps That Did More Than Show the Way Forward", retrieved from << https://www.usgamer.net/articles/the-20-best-in-game-maps >>, Jun. 3, 2020, 16 pages.

"Where data teams do their best work", retrieved from << https://deepnote.com/ >>, no later than Oct. 14, 2022, 6 pages.

"The Jupyter Notebook", retrieved from << https://jupyter-notebook.readthedocs.io/en/stable/notebook.html >>, no later than Oct. 14, 2022, 9 pages.

"The Jupyter Notebook Format", retrieved from << https://ipython.org/ipython-doc/3/notebook/nbformat.html >>, no later than Oct. 14, 2022, 6 pages.

"Acoustic Minimaps", retrieved from << https://ceal.cs.columbia.edu/minimap.html >>, no later than Oct. 14, 2022, 6 pages.

"Drag and drop", retrieved from << https://en.wikipedia.org/wiki/Drag_and_drop >>, Mar. 16, 2022, 4 pages.

"Table of Contents", retrieved from << https://jupyterlab.readthedocs.io/en/stable/user/toc.html >>, no later than Oct. 15, 2022, 5 pages.

Jamie Garroch, "How to update PowerPoint preview thumbnail icons", retrieved from << https://www.brightcarbon.com/blog/how-to-update-powerpoint-preview-thumbnail-icons/ >>, May 6, 2020, 23 pages.

Greg Werner, "Jupyter Notebook: Little-Known Tricks!", retrieved from << https://medium.illumidesk.com/jupyter-notebook-little-known-tricks-b0866a558017 >>, May 17, 2017, 5 pages.

"Chapter 5 Jupyter Notebook ecosystem", retrieved from << https://jupyter4edu.github.io/jupyter-edu-book/jupyter.html >>, no later than Oct. 15, 2022, 16 pages.

Julien Delange, "Analyze Python Code in Jupyter Notebooks", retrieved from << https://www.kdnuggets.com/2021/10/analyze-python-code-jupyter-notebooks.html >>, no later than Oct. 15, 2022, 5 pages.

"Mini-map", retrieved from << https://en.wikipedia.org/wiki/Mini-map >>, May 30, 2022, 3 pages.

"Working with EMR Notebooks", retrieved from << https://docs.aws.amazon.com/emr/latest/ManagementGuide/emr-managed-notebooks-working-with.html >>, no later than Nov. 6, 2022, 7 pages.

"Using Jupyter Notebooks", retrieved from << https://colab.research.google.com/github/d2l-ai/d2l-en-colab/blob/master/chapter_appendix-tools-for-deep-learning/jupyter.ipynb >>, no later than Nov. 6, 2022, 7 pages.

"Observable for Jupyter Users", retrieved from << https://observablehq.com/@observablehq/observable-for-jupyter-users >>, no later than Nov. 6, 2022, 11 pages.

"GitHub—bollwyvl/ipython-notebook-navigator: This is a stand-alone navigation enhancement for the IPython (1 .0) HTML Notebook," Retrieved from the Internet:URL: https://web.archive.org/web/20200905161557/https://github.com/bollwyvl/ipython-notebook-navigator/ Sep. 5, 2020, 04 Pages.

"The I Python Notebook—I Python 3.2.1documentation," Retrieved from the Internet: URL: https://web.archive.org/web/20221006034904/https://ipython.org/ipython-doc/3/notebook/notebook.html, Oct. 6, 2022, 09 pages.

International Search Report and Written Opinion received for PCT Application No. PCT/US23/036548, Feb. 9, 2024, 15 pages.

* cited by examiner

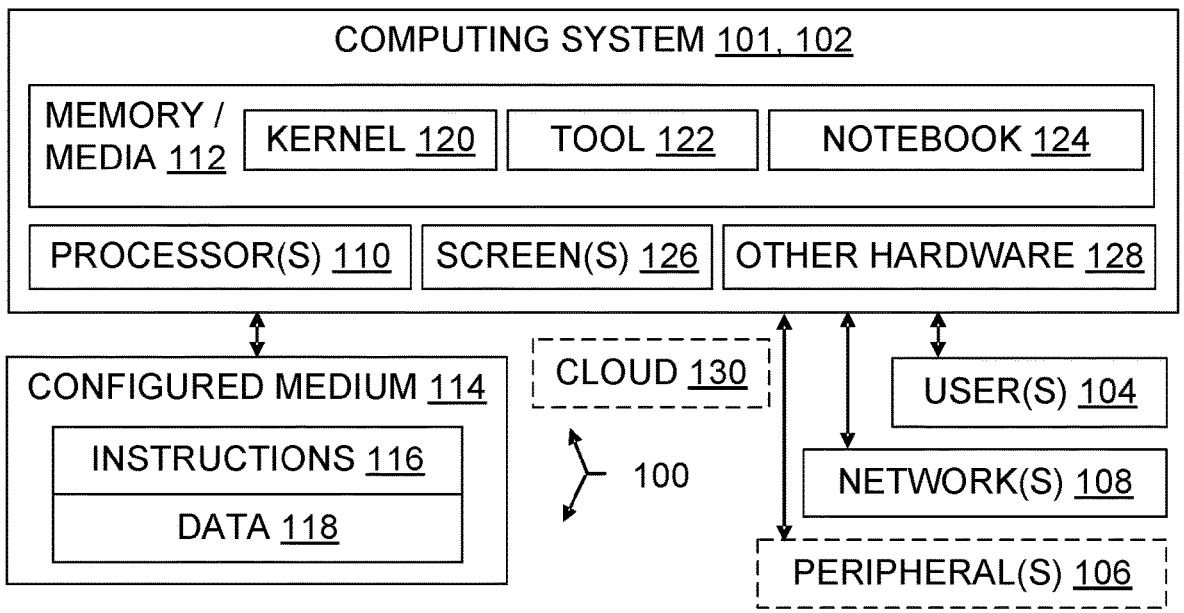
Fig. 1
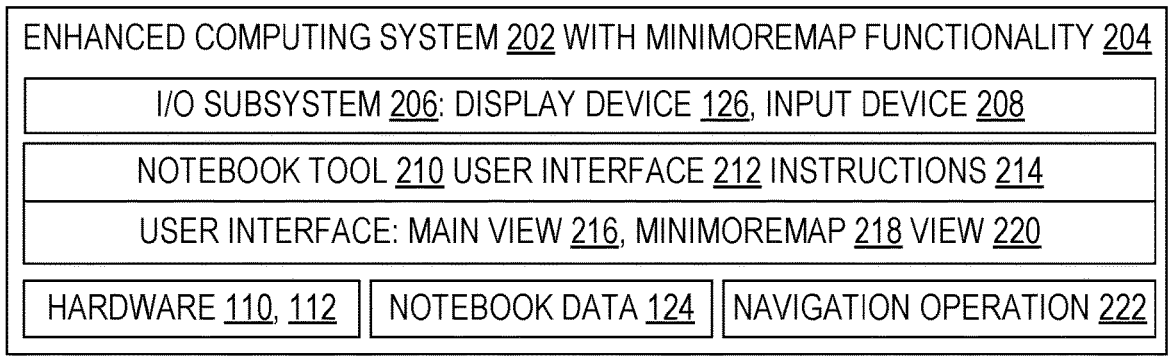
Fig. 2
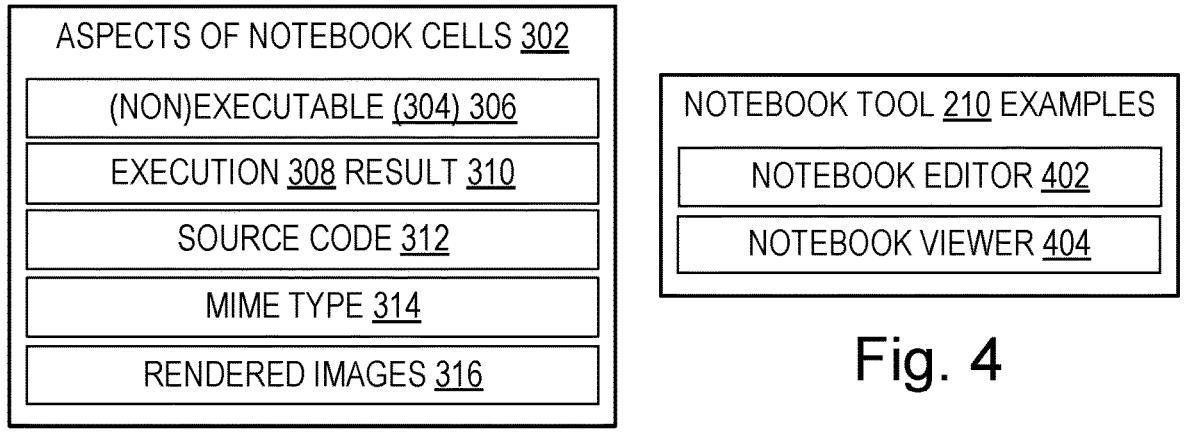
Fig. 3
Fig. 4

| ASPECTS OF SOME MINIMOREMAP VIEWS 220 |
|---|
| COLUMN 502: NOTEBOOK PORTION 504, SNAPSHOT 506, RESULT 310 |
| CONTEXT MENU 508 — RENDERER 510, RENDER ARCHITECTURE 512 |
| SCALED IMAGE 514 — TEXT 516 / RECTANGLE 518 / LINE SEGMENT 520 |
| ICON 522 OR GRAPHIC 524 OR PROPORTIONAL GRAPHIC 526 VERSUS: LINE GRAPH 528, PIE CHART 530, BAR GRAPH 532, TABLE 534, MAP 536, VIDEO 538, SOURCE CODE 312, FORM 540, SLIDER 542, ERROR LIST 544, STILL IMAGE 546, OR OTHER CONTENT 548 |
| SYNTAX HIGHLIGHTING 554 — INTERACTION COMMAND 550 — RANGE 552 |

Fig. 5

| ASPECTS AND EXAMPLES OF SOME INTERACTION COMMANDS 550 |
|---|
| MAIN VIEW VIEWPORT 602 MOVEMENT COMMAND 604 |
| CELL ORDER 606 REARRANGEMENT 608 COMMAND 610 |
| CELL SELECTION 612 COMMAND 614 — CELL VISIBILITY 616 COMMAND 618 |
| CELL EXECUTION GROUPING 620 COMMAND 622 |
| CELL EXECUTION 308 COMMAND 624 — CELL COLLAPSE 626 COMMAND 628 |
| CELL DEPENDENCY 630 COMMAND 632 — CELL MERGE 634 COMMAND 636 |

Fig. 6

MULTICELL DOCUMENT EDITOR MINIMOREMAP

BACKGROUND

Noon With the ongoing development of computer software, many different kinds of digital documents have become available for use in various ways. Plain text prose, formatted text prose, formatted or plain text computer source code, and markup/markdown language text are each widely used, and each can be edited using various software tools. Images are also presented to human viewers in various digital documents, and in some cases the images can also be edited by the viewer. Text and images may be combined in a single document, by using a suitable word processor, or computer-aided design software, or graphics editing software, for example.

"Notebook documents" (sometimes called "notebooks") are recent additions to this landscape of documents. A notebook may include both prose text and computer code, e.g., a script written in a script programming language. Executing the script of a notebook may produce a graph or other image that is also part of the notebook. Editing the script will result in a corresponding update to the image generated by the script. Some notebooks can be edited, executed, and presented in a web browser, by using a client-server software application specifically designed for such notebooks.

However, advances in technology for human interaction with software that displays notebook documents would be beneficial.

SUMMARY

Some embodiments described herein address technical challenges related to computer-human interaction, and more particularly challenges related to interactions involving notebook documents ("notebooks"). Some notebook viewing tools and some notebook editing tools provide only a single view of a notebook document. In hindsight, a single-view tool architecture creates or increases complexity, inefficiency, inaccuracy, and difficulty for user-cell interaction activities in a tool, such as selecting a range of notebook cells, determining dependency relationships between notebook cells, managing cells that have different levels of relevance or recency, controlling cell visibility, rearranging cells into a different order, grouping cells, and combining cells.

Some embodiments described herein facilitate user interaction operations on notebooks by providing at least two simultaneous and coordinated views on notebook cells. In some scenarios, a notebook includes at least one executable cell and at least one non-executable cell. An I/O subsystem user interface has a main view and a minimoremap view. The term "minimoremap" was coined for use in this disclosure. Minimoremap functionality may overlap a minimap functionality of a viewer or an editor outside the realm of notebook tools, but a minimoremap view also provides notebook-related capabilities that are not provided by mere minimaps.

In some embodiments, an enhanced tool obtains minimoremap images of respective cells of a notebook. In some scenarios, for greater efficiency the minimoremap image is not a scaled down image of a main view image of the cell. In general, the enhanced tool displays less than all of the notebook in the main view, and simultaneously displays more of the notebook than that in the minimoremap view.

In some embodiments, the main view and the minimoremap view are displayable as simultaneous views, and they operate together as coordinated views. In some scenarios, the enhanced tool receives a command in one of the views, and changes notebook data accordingly in both views. For example, rearranging cell order in the minimoremap view rearranges the underlying document's cell ordering, and to the extent a result of the ordering change is within the main view's viewport, the result will be displayed there. Similarly, a range of cells can be efficiently selected using the minimoremap view, without scrolling cells into, through, and out of the main view's viewport. Other examples of views coordination are also provided herein.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 1 is a diagram illustrating aspects of computer systems and also illustrating configured storage media, including aspects generally suitable for systems which support a minimoremap functionality;

FIG. 2 is a block diagram illustrating an enhanced system configured with a minimoremap functionality;

FIG. 3 is a block diagram illustrating some aspects of some notebook cells;

FIG. 4 is a block diagram illustrating some examples of notebook tools;

FIG. 5 is a block diagram illustrating some aspects of some minimoremap views;

FIG. 6 is a block diagram illustrating some aspects and examples of view interaction commands;

DETAILED DESCRIPTION

Overview

Figure 7:
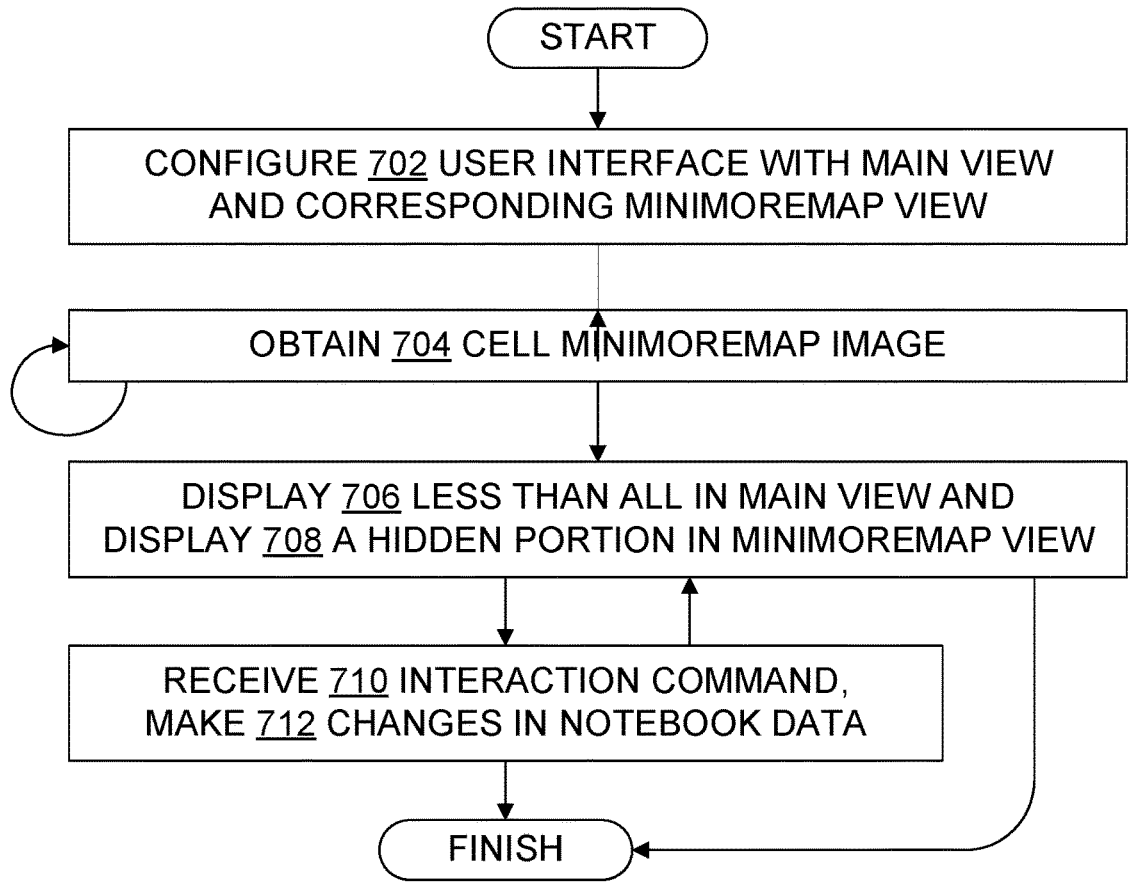
FIG. 7 is a flowchart illustrating steps in some notebook operation methods, with particular attention to interaction via a main view and a minimoremap view.

Innovations may expand beyond their origins, but understanding an innovation's origins can help one more fully appreciate the innovation. In the present case, some teachings described herein were motivated by technical challenges faced by Microsoft innovators who were working to improve a notebook editor tool.

Microsoft innovators noted that notebooks are useful in a wide variety of applications, including integrated development environments (IDEs) like the Microsoft Visual Studio® and VSCode™ tools (marks of Microsoft Corporation), Minecraft® and other video gaming environments (mark of Mojang Synergies AB Corporation), Azure® Machine Learning and other machine learning platforms, Azure® Synapse and other analytics tools (mark of Microsoft Corporation), GitHub® and other repository environments (mark of GitHub, Inc.), spreadsheet tools, computing laboratory environments, database tools, and many other software offerings. Within Minecraft® environments, for example, notebooks are used to teach kids how to program using Python® (mark of the Python Software Foundation) and a Minecraft® virtual world, using a notebook component look and feel that matches the Minecraft® aesthetic.

In particular, a technical challenge was to how to provide the notebook editor with a document overview functionality similar to the minimap document overview functionality that is provided, e.g., in some PDF (portable document format) document viewer tools or in some source code editor tools. In some of these tools, a so called "minimap" is a scaled-down version of a portion of the document. The minimap is usually displayed near the top right corner of the viewport; the viewport includes the part of the document that is currently displayed. A minimap often shows at least some of the document that is not in the viewport, thereby providing the user with a larger overview of the document's content than the viewport alone provides, and also proving an overview of the position of the viewport relative to the rest of the document.

With this in mind, a first approach considered by the innovators was to replicate minimap functionality by placing a scaled-down version of the notebook in the notebook editor, e.g., in the top right corner of the viewport. However, this scaled-down image approach has several disadvantages or challenges that arise from fundamental differences between a notebook, on the one hand, and a PDF document or a source code document, on the other hand.

Different notebook cells often have different kinds of content, e.g., different mime types. A mime type (a.k.a. multipurpose internet mail extension type or media type) indicates the type of content in an item. For example, some notebook cells are executable, and others are not. Some cells hold natural language text, some hold source code text, and others hold graphs, or charts, or photos, or video, or other kinds of content. Some cells hold content that is generated by the execution of code that resides in one or more of the other cells.

As a result, scaling down an image of a cell and placing it in a minimap would often be an inefficient use of computational resources. Significant amounts of processor time, memory, and other resources would be spent generating the full-size images of cells that are not currently displayed in the main view, so that those images could be scaled down and placed in the minimap view. Moreover, the scaling down would be lossy—some details in the full-size image would not survive the scaling down. Thus, the expenditure of resources to generate those lost details of the full-size image would be a wasted expenditure.

Also, different notebook cell images are sometimes produced by different rendering engines. An engine which renders text might not render a line graph, and vice versa. Indeed, one cell may effectively be the rendering engine for another cell. A single rendering engine can be used for an entire non-notebook document, e.g., a source code file. By contrast, rendering notebook cells often involves multiple rendering engines. Indeed, it is unlikely but nonetheless possible that each cell of a notebook uses its own respective rendering engine.

Approaching notebooks as if they are simply source code files or PDF documents also has the disadvantage of an opportunity cost. In many viewers or editors that are designed for source code files or PDF documents, minimaps do little if anything other than provide an overview of the content. The Microsoft innovators realized that limiting notebook tool enhancements to a notebook minimap—a mere content overview mechanism—would lead them to overlook significant opportunities to do more than minimaps can do.

Accordingly, the innovators identified and addressed several technical challenges. These challenges and the ways embodiments address them will become evident to those of skill in the art upon study of the teachings provided herein, including some examples given here.

One technical challenge is how to provide a notebook tool with a document overview functionality similar to the minimap document overview functionality that is present in some non-notebook tools. An aspect of this challenge is how to provide the overview functionality without wasting substantial resources to render details of a full-size image which are then lost by scaling down to create a minimap-size image. Beneficially, some embodiments provide suitably sized images without wasting resources by rendering-and-then-scaling-down, and sacrificing visual clarity by loss of detail. Instead, the cell mime type is determined, and a corresponding icon is obtained for display in a minimoremap. For instance, a map icon is displayed instead of a scaled-down image of a map, a line graph icon is displayed instead of a scaled-down image of a line graph, a natural language text icon is displayed instead of a scaled-down image of a natural language text, and so on.

Another technical challenge is how to improve the usability, accuracy, efficiency, and scope of interaction operations on notebook cells. For example, without minimoremap functionality, selecting a range of contiguous cells involves selecting a cell at a first end of the range, scrolling or using a slider bar to reach a cell at a second end of the range, and then extending the selection to enclose the cell at the second end and all the intervening cells. But with a minimoremap, the selection can be made in the minimoremap view. This has the advantage of not changing the user's current place in the notebook, and the advantage of not expending resources to render some or all of the intervening cells merely to have those rendered images pass quickly through the viewport.

As additional examples of how to improve the usability, accuracy, efficiency, and scope of interaction operations on notebook cells, minimoremap functionality in some embodiments recognizes and performs one or more of the following interaction commands: a cell order rearrangement command, a cell selection command, a cell visibility command, a cell execution grouping command, a cell dependency command, an executable cell execution command, a cell collapse command, or a merge cells command.

As to benefits, by implementing these commands as minimoremap functionality, embodiments can often perform these operations without changing the user's current focus position in the notebook. The current focus position is, e.g., the currently selected cell or the current text insertion point. Of course, in some scenarios a change to the notebook resulting from the command changes the focus, e.g., by hiding a currently selected cell. But cells can be reordered, for example, using the minimoremap, without also changing the user's current focus position. Without the minimoremap, the focus position would have changed if more than one cell was moved.

Another benefit of some embodiments is the ability of a multi-column minimoremap to display different aspects of a notebook without changing or cluttering the main view, and without changing the notebook itself merely for display purposes. For example, in some scenarios, different columns of a minimoremap view display different respective snapshots of at least a portion of the notebook at different times. In some, different columns display different execution results of different respective executable cells of the notebook. These multi-column displays provide users with information that improves the usability, accuracy, efficiency, and scope of interaction operations on notebook cells.

Another benefit of some embodiments is the ability to activate a context menu whose context includes a cell that is not displayed in the main view, but is visible in the minimoremap. This improves the scope of interaction operations on notebook cells.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 130. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 212 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface 212 supports interaction between an embodiment and one or more human users. In some embodiments, the user interface 212 includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 130 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software apps, on mobile devices 102 or workstations 102 or servers 102, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, minimoremap functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

In any later application that claims priority to the current application, reference numerals may be added to designate items disclosed in the current application. Such items may include, e.g., software, hardware, steps, methods, systems, functionalities, mechanisms, data structures, resources, entities, or other items in a computing environment, which are disclosed herein but not associated with a particular reference numeral herein. Corresponding drawings may also be added.

More About Systems

FIG. 2 illustrates a computing system 102 configured by one or more of the minimoremap enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

FIG. 3 shows some aspects of some notebook cells 302. This is not a comprehensive summary of all aspects of notebooks 124 or all aspects of notebook cell functionality. Nor is it a comprehensive summary of all aspects of an environment 100 or system 202 or other context of notebooks 124, or a comprehensive summary of all notebook cell viewing or editing mechanisms 210 for potential use in or with a system 102. FIG. 3 items are discussed at various points herein, and additional details regarding them are provided in the discussion of a List of Reference Numerals later in this disclosure document.

FIG. 4 illustrates some examples of notebook tools 210. FIG. 4 is not a comprehensive summary of all notebook tools 210. Notebook tools 210 may be incorporated into other tools, e.g., integrated development environments 122. FIG. 4 items are discussed at various points herein, and additional details regarding them are provided in the discussion of a List of Reference Numerals later in this disclosure document.

FIG. 5 illustrates some aspects of some minimoremap views 220. FIG. 5 is not a comprehensive summary of all minimoremap views 220 or all minimoremaps 218. FIG. 5 items are discussed at various points herein, and additional details regarding them are provided in the discussion of a List of Reference Numerals later in this disclosure document.

FIG. 6 illustrates some aspects and examples of some tool 210 interaction commands 550. FIG. 6 is not a comprehensive summary of all interaction commands 550 or all interactions with a tool 210. FIG. 6 items are discussed at various points herein, and additional details regarding them are provided in the discussion of a List of Reference Numerals later in this disclosure document.

Figure 8:
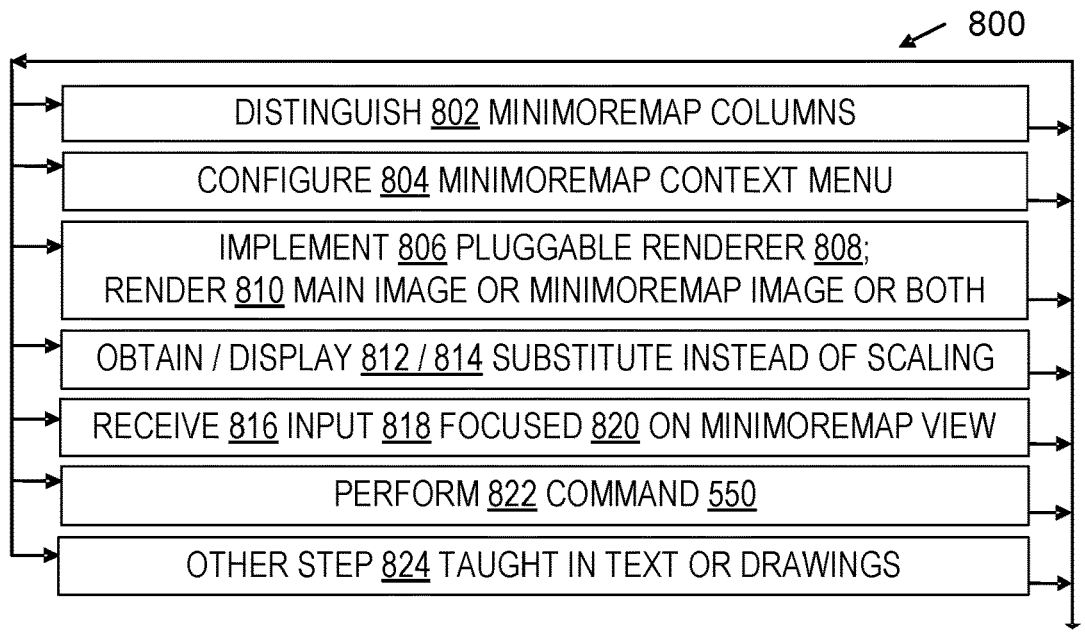
FIG. 8 is a flowchart further illustrating steps in notebook operation methods, and incorporating FIG. 7.

The other figures are also relevant to systems. FIGS. 7 and 8 illustrate methods of system operation. FIGS. 9 through 13 illustrate system displays 126 which are configured by a tool 210 user interface 212, by virtue of an execution of instructions 214, 116 by a system processor 110.

In some embodiments, the enhanced system 202 is networked through an interface. In some, an interface includes hardware such as network interface cards, software such as network stacks, APIs, or sockets, combination items such as network connections, or a combination thereof.

Some embodiments include a system 202 with a notebook tool 210 that has a main view 216 and a minimoremap view 220. In some cases, the notebook tool 210 is a notebook editor 402, and in some cases the notebook tool 210 is a notebook viewer 404 that does not support editing but still allows execution 308 of executable cells 306 on demand. In some embodiments, a minimum required functionality 204 of a minimoremap view 220 is that it shows more of the notebook 124 than appears at a time in the main view 216, and that navigating in either view produces 712 a corresponding change in the other view for at least one navigation operation 222.

In some embodiments, a computing system 202 is equipped to perform operations on a multicell multicategory document (a "notebook") 124. The notebook has data 124, 118 which includes at least one executable cell 306 and at least one non-executable cell 308. The computing system 202 includes: a digital memory 112 and a processor 110 in operable communication with the digital memory, an I/O subsystem 206 including a display device 126 and an input device 208, and a notebook tool 210. The notebook tool 210 has user interface instructions 214, 116 which upon execution by the processor 110 configure the I/O subsystem with a user interface 212. The user interface 212 has a main view 216 and a minimoremap view 220.

In some embodiments, the notebook and the notebook tool are further characterized such that when the notebook 124 is loaded into the notebook tool 210, less than all of the notebook is displayed 706 on the display device in the main view 216. A portion of the notebook which is not displayed 706 in the main view is simultaneously displayed 708 on the display device in the minimoremap view 220. Also, a navigation operation 222 that changes 712 notebook data 124 displayed in either of the views 216 or 220 also produces 712 a corresponding change in notebook data displayed in the other view.

In some embodiments, the notebook tool 210 includes at least one of: a notebook editor 402 which supports editing a source code 312 of the executable cell, executing 308 the executable cell, and displaying 706 a result 310 of executing the executable cell; or a notebook viewer 404 which supports executing 308 the executable cell and displaying 706 a result 310 of executing the executable cell.

Some embodiments include a multicolumn minimoremap 218. The different columns 502 can show, e.g., different parts 504 of a very long notebook, or different time snapshots 506 of the notebook, or results 310 from executing different notebook cells 302.

Figure 12:
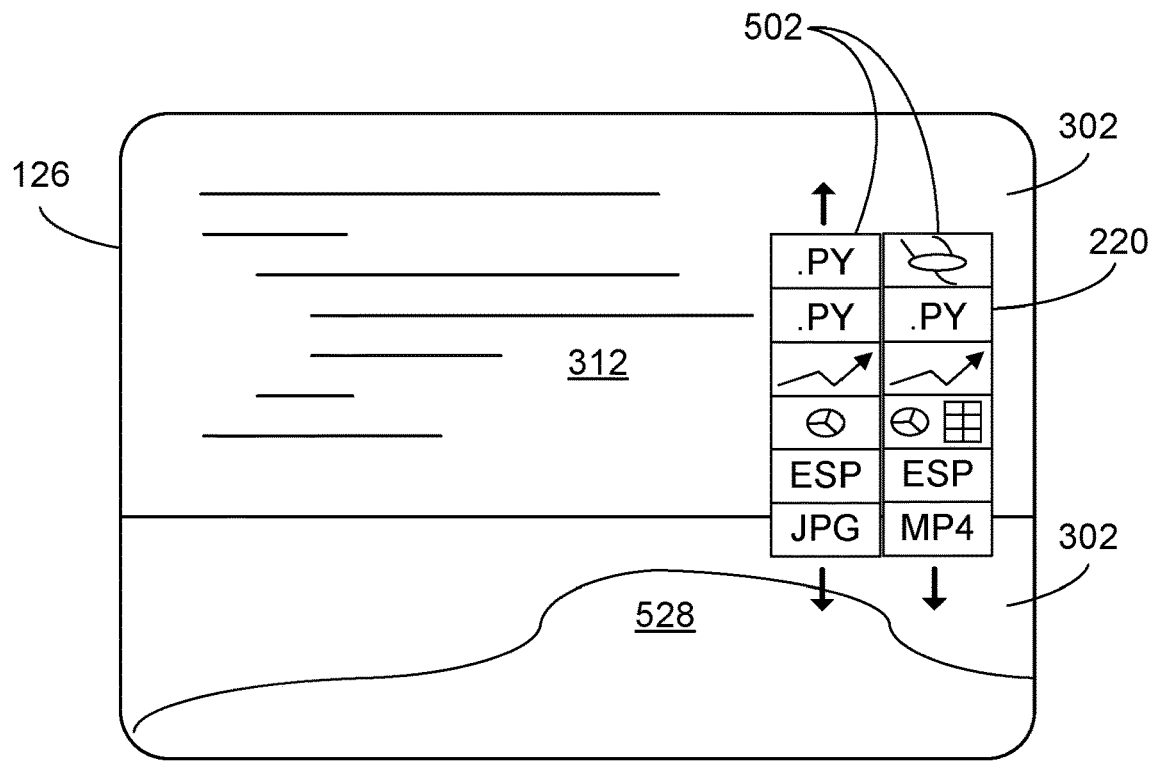
FIG. 12 is a stylized display diagram illustrating a minimoremap view with two columns.
Figure 13:
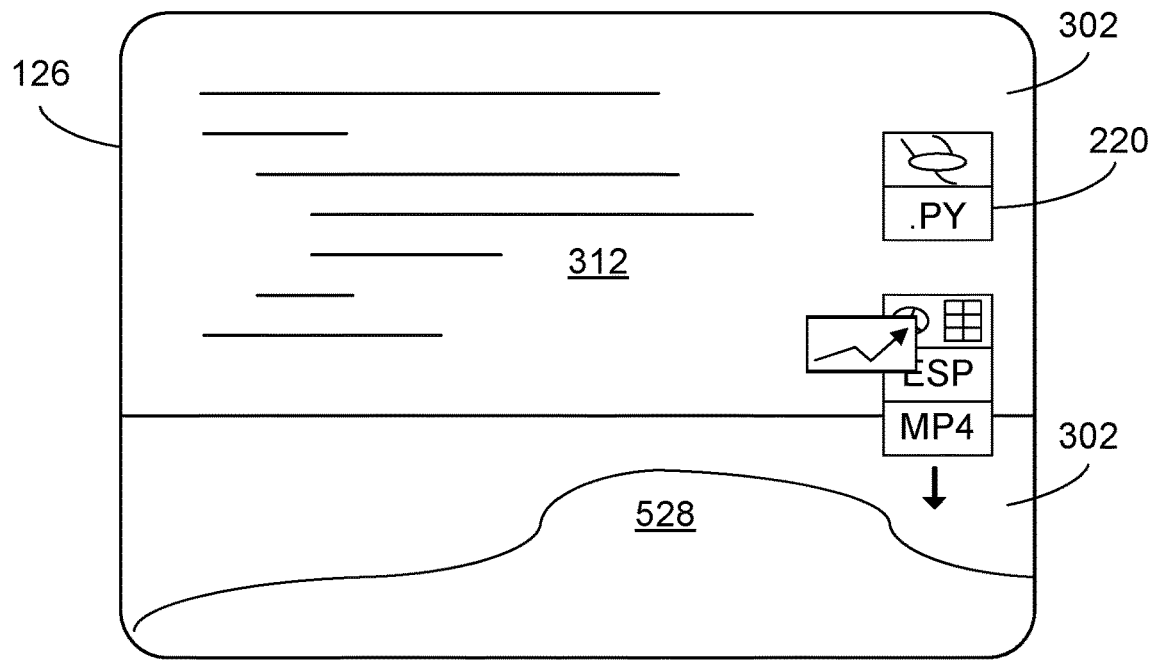
FIG. 13 is a stylized display diagram illustrating a minimoremap view with a selected cell being dragged as it is moved to a different location in a notebook cell ordering.

FIG. 12 shows an example multicolumn minimoremap 218, in which each column 502 shows a different respective time snapshot 506 of the notebook. The FIG. 12 notebook 124 is the FIG. 9 notebook after some editing. The left column snapshot in the minimoremap view 220 represents an earlier point in time than the right column snapshot.

In the intervening time between the two snapshots, the topmost Python® source code 312 containing cell (represented by the topmost .PY cell image) has been deleted (Python is a mark of the Python Software Foundation). A cell containing a map 536 has taken its place, as represented by a map icon 522 at the top of the rightmost column 502.

This map cell was outside the minimoremap view 220 viewport when the left column snapshot was taken, but is within that viewport for the right column snapshot. At the time of the right column snapshot, this map cell is the first cell of the notebook, so there is no up arrow above the right column to indicate one or more additional cells above the right column's viewport.

In the intervening time between the two snapshots, a table 534 has also been added to a cell (fourth down from the top) that previously contained a pie chart 530, so that the cell now contains both the table and the pie chart, as indicated by respective items (proportional table graphic 526, pie chart icon 522) in the minimoremap view 220. Also, a jpeg still image 546 cell (represented by the JPG graphic) has been edited to include instead an mp4 video 538 (represented by the MP4 graphic).

These notebook edits are only examples; other edits are also consistent with the display shown in FIG. 12.

In some embodiments, the minimoremap view 220 includes multiple columns 502, and each of the columns is distinguished 802 from at least one other of the columns in at least one of the following ways: different columns display 708 different respective portions 504 of the notebook; different columns display 708 different respective snapshots 506 of at least a portion of the notebook at different times; or different columns display 708 different execution results 310 of different respective executable cells 306 of the notebook.

Figure 11:
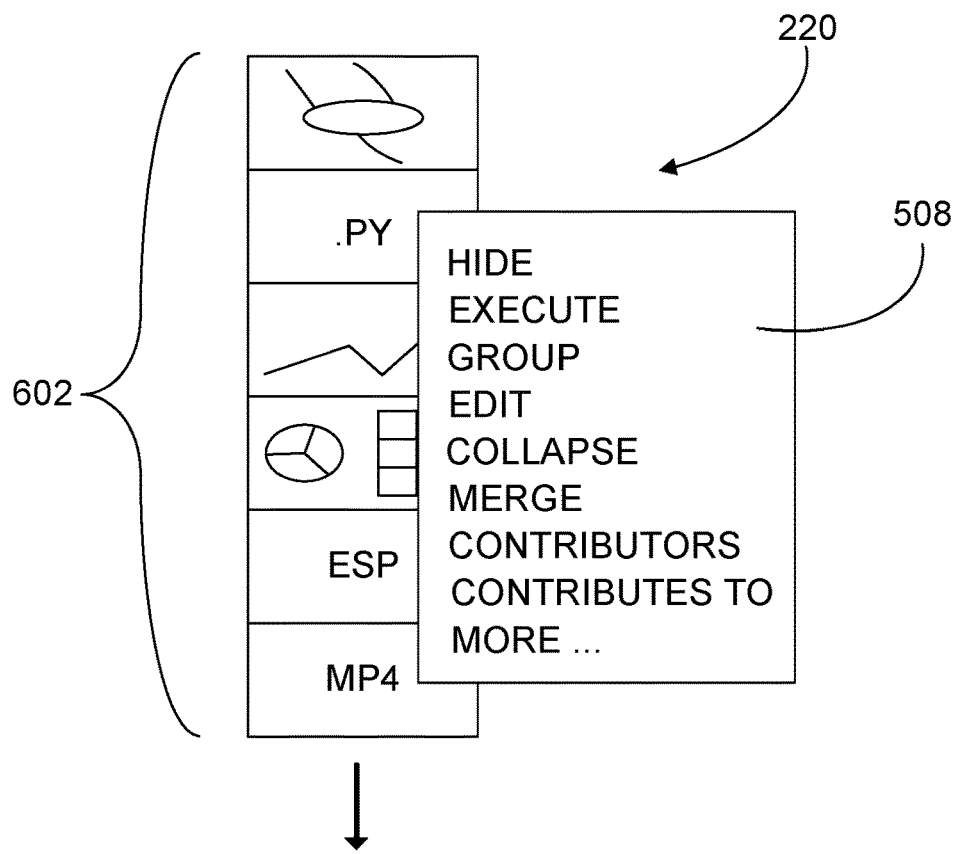
FIG. 11 is a stylized display diagram illustrating a minimoremap view with an active context menu.

Some embodiments include a context menu 508 as part of the minimoremap view. FIG. 11 shows an example minimoremap context menu 508, with entries corresponding to some interaction commands. In this context menu, HIDE represents a cell visibility 616 toggle command 618, EXECUTE represents a cell content execution 308 command 624, GROUP represents a command 622 to group 620 executable cells 306 so that a command to execute any cell of the group 620 causes execution 308 of all cells of the group, EDIT represents a command 550 to edit a cell, with editing 402 functionality that varies according to the cell's mime type 314 (for editing natural text 516 versus editing source code 312 versus editing a line graph 528 versus editing a map 536, etc.), COLLAPSE represents a command 628 to collapse 626 a cell so that it displays as a smaller or shorter preview version of the cell's content, MERGE represents a command 636 to merge 634 the contents of multiple cells into a single cell, CONTRIBUTORS represents a command 632 to show a dependency 630 relationship by showing which cell(s) contribute an execution result to a given cell, and CONTRIBUTES TO represents a command 632 to show dependency 630 by showing which cell(s) a given cell contributes an execution result to. In some embodiments, the user interface instructions 214 include minimoremap context menu instructions 214, 116 which upon execution 308 by the processor 110 configure the user interface 212 with a context menu 508 as a part of the minimoremap view 220.

Various embodiments utilize different render architectures 512. A first render architecture 512 includes an IDE extension 122, 510, 808 which renders 810 both the main view 216 image 316 of the cell and the minimoremap 220 image 316 of the cell. In a second render architecture 512, an extension 122, 510, 808 renders 810 only the main view image, whereas a default minimoremap renderer 510 renders the minimoremap image.

In some embodiments, the user interface instructions 214 upon execution implement at least one of the following render architectures 512. In a fully custom render architecture 512, for a given cell of a given mime type, a pluggable renderer 808 for the mime type 314 renders 810 a main view image of the given cell for the main view 216 and the same pluggable renderer 808 also renders 810 a corresponding minimoremap image of the given cell for the minimoremap view. In a semi-custom render architecture 512, for a given cell of a given mime type, a pluggable renderer 808 for the mime type 314 renders 810 a main view image of the given cell for the main view but does not render a corresponding minimoremap image. Instead, a separate minimoremap renderer 510 renders 810 the corresponding minimoremap image of the given cell for the minimoremap view.

Regardless of the render architecture 512 employed, some embodiments promote efficiency and image accuracy by using scaling-down to render 810 a minimoremap image of a cell only when the cell's main view image is currently displayed in the main view viewport. When the main view image is not currently displayed in the main view viewport, rendering the minimoremap image by scaling down the main view image risks doing unnecessary work or producing an outdated image or both. Accordingly, in these embodiments the minimoremap image rendering 810 does not using scaling-down for non-displayed 706 cells, but instead produces an icon 522, a graphic 524, or a proportional graphic 526, based on the cell's mime type 314 and in some cases on the cell's actual content.

In these embodiments, icons 522 distinguish between, e.g., maps, line graphs, and pie charts, while graphics 524 distinguish further between, e.g., different kinds of source code. Proportional graphics 526 are graphics 524 that distinguish, e.g., between groups of tables that have different aspect ratio ranges (aspect ratio being the ratio of columns to rows, or vice versa). However, in some variations, icons 522 are used but the distinction made via graphics 524 between different natural languages or between different programming languages is not made; each kind of natural language text is matched to a single natural language icon 522 (e.g., "TEXT"), and all source code text is matched to a single programming language icon 522 (e.g., "SOURCE"). In some of these embodiments, and in some other embodiments, a scaled-down image also appears in the minimoremap, whereas in other embodiments scaled-down images do not appear in the minimoremap.

In some embodiments, if the cell's mime type indicates any of the following kinds of content, then the minimoremap image is rapidly and efficiently rendered as a corresponding icon 522: line graph 528, pie chart 530, bar graph 532, table 534, map 536, video 538, form 540, slider 542, list 544, or still image 546. Variations use a different list of mime types, e.g., by adding or omitting mime types from the list of mime types rendered as icons, or as noted below, or both.

In some variations, source code 312 is represented in the minimoremap by an icon 522 independent of the particular programming language, or is instead represented by a graphic 524 which depends on the programming language, e.g., ".PY" or "R" or "C++", etc. In some variations, source code 312 syntax highlighting 554 that is shown in the main view image is also indicated visually in the minimoremap image.

In some variations, a natural language text 516 is represented in the minimoremap by an icon 522 independently of the particular language, or is represented instead by a graphic 524 which depends on the language, e.g., "ESP" for Espanol (Spanish), "ENG" for English, etc. In some, natural language text 516 is represented instead by image data 118 which does not depend on the language, e.g., with rectangles 518 in place of characters or line segments 520 in place of lines of text, or both.

In some variations, a table 534 is represented by a proportional graphic 526 which has an aspect ratio (ratio of rows to columns) based on the actual table in the cell.

Other system embodiments are also described herein, either directly or derivable as system versions of described processes or configured media, duly informed by the extensive discussion herein of computing hardware.

Although specific minimoremap architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of minimoremap functionality, for example, as well as different technical features, aspects, mechanisms, rules, criteria, expressions, hierarchies, operational sequences, data structures, environment or system characteristics, or other functionality consistent with teachings provided herein, and may otherwise depart from the particular examples provided.

Processes (a.k.a. Methods)

Methods (which are also be referred to as "processes" in the legal sense of that word) are illustrated in various ways herein, both in text and in drawing figures. FIGS. 7 and 8 each illustrate a family of methods 700 and 800 respectively, which are performed or assisted by some enhanced systems, such as some systems 202 or another minimoremap enhanced system as taught herein. Method family 700 is a proper subset of method family 800.

FIGS. 1 through 6 and 9 through 13 illustrate minimoremap system 202 architectures with implicit or explicit actions, e.g., rendering 810 images 316, navigating 222 within a notebook 124 that is loaded in a tool 210, rearranging 608 notebook cell order (FIG. 13), matching a cell 302 to an icon 522 or a graphic 524 or a proportional graphic 526 based on the cell's mime type 314 and possibly other data such as a language identification, providing functionality via a context menu 508, or otherwise processing data 118, in which the data 118 include, e.g., notebook data 124 such as mime types 314 and cell 302 content, pixels of a display 126, and commands 550, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types in a value for the system 202 to use as a file name for a notebook 124. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 8. FIG. 8 is a supplement to the textual examples of embodiments provided herein and the textual descriptions of embodiments provided herein. In the event of any alleged inconsistency, lack of clarity, or excessive breadth due to an aspect or interpretation of FIG. 8, the text of this disclosure shall prevail over that aspect or interpretation of FIG. 8.

Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 800 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 8 to be non-operable, the sequence S is not within the scope of any claim. Any assertion otherwise is contrary to the present disclosure.

In some embodiments, the minimoremap includes at least one cell image that is not merely a scaled-down image of the cell's main view image.

Some embodiments provide or utilize an interaction method to perform operations on a multicell multicategory document (a "notebook") 124, the notebook having data 124 which includes at least one executable cell 306 and at least one non-executable cell 304. The method is performed by a computing system 202 which includes an I/O subsystem 206. The I/O subsystem 206 includes a display device 126 and an input device 208. The method includes: configuring 703 the I/O subsystem with a user interface 212, the user interface having a main view 216 and a minimoremap view 220; obtaining 704 a minimoremap 218 image 316 of a cell 302 of the notebook, the minimoremap 218 image not being a scaled down image of a main view 216 image 316 of the cell; and displaying 706 less than all of the notebook on the display device in the main view, and simultaneously displaying 708 in the minimoremap view a portion 504 of the notebook which is not displayed in the main view, the displaying 708 in the minimoremap view including displaying 708 the minimoremap image of the cell.

Figure 9:
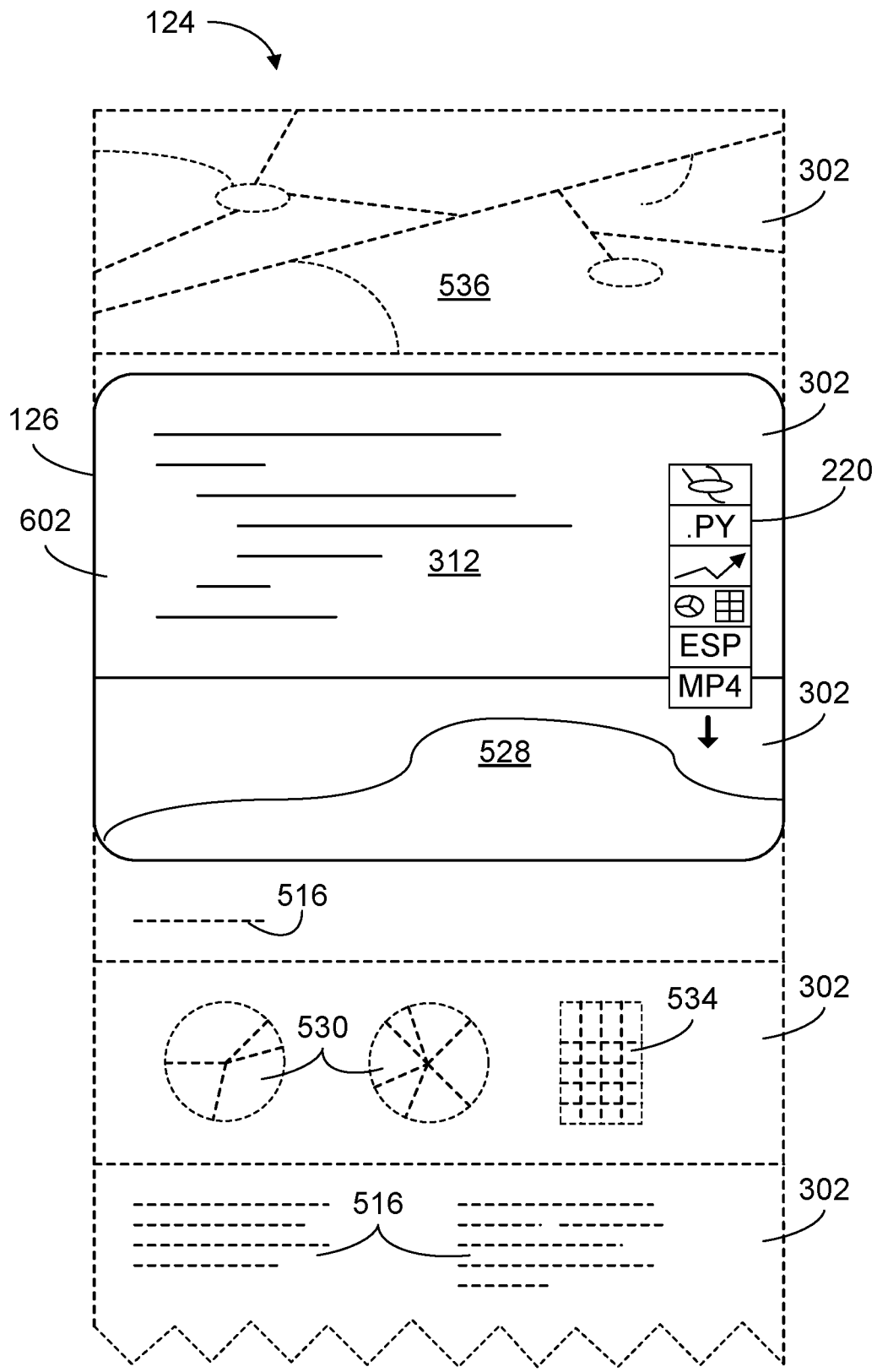
FIG. 9 includes a stylized notebook diagram and a stylized display diagram collectively illustrating notebook cells, a main view with a main view viewport, and a minimoremap view.
Figure 10:
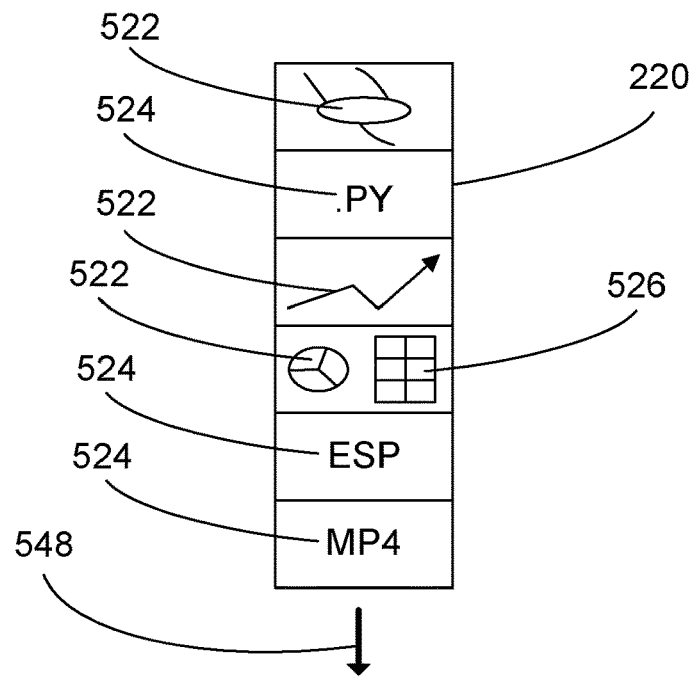
FIG. 10 is a stylized display diagram further illustrating a minimoremap view portion of FIG. 9.

In FIG. 9, for example, the portion 504 of the notebook which is not displayed 706 in the main view is drawn in dashed lines, whereas the portion 504 of the notebook which is displayed 706 in the main view, and the entire minimoremap view, are each drawn in solid lines. The portion 504 of the notebook which is displayed 706 in the main view is displayed because it is within a main view viewport 602. The portion displayed 706 in the main view viewport 602 in FIG. 9 includes almost all of a cell 302 that contains source code 312, and more than half of a cell 302 that contains a line graph 528 and some text 516; the text of this cell is outside the main view viewport 602 and thus is not currently visible in the display 126.

The minimoremap view 220 in FIG. 9 has a minimoremap view viewport, which displays six minimoremap images representing six respective cells 302. Other minimoremap view viewports may display 708 a different number of cells 302. But in general, the minimoremap view displays 708 a representation of more cells than the number of cells that is displayed 706 in the main view viewport. In FIG. 9, the downward pointing arrow below the six minimoremap images indicates that additional cells of the notebook exist following the MP4 cell. Some minimoremap views 220 use a different visual clue than an arrow, and some do not provide any overt visual clue about the relative position of the minimoremap view viewport within the notebook.

In various embodiments, a minimoremap view 220 differs from a scaled-down main view 216 in one or more ways. One benefit of using an image 316 other than a scaled-down image as a minimoremap image is reminding the user what the actual cell 302 contains while reducing detail that would be difficult to read in an image that is smaller than the main view image. Another benefit is rendering 810 the minimoremap image faster than scaling-down the main view of the cell would take.

In various embodiments, obtaining 704 the minimoremap image 316 that is not a scaled down image includes obtaining 704 at least one of the following: a minimoremap image containing a rectangle 518 in place of a text 516 (the mapping of rectangles to text characters is not necessarily 1-to-1), a minimoremap image containing a rectangle 518 in place of (i.e., representing) a source code text 312 and also containing a syntax highlighting 554; a minimoremap image containing a line segment 520 in place of a text; a minimoremap image containing a line segment 520 in place of a source code text 312 and also containing a syntax highlighting 554; a minimoremap image containing a line graph 528 icon 522 in place of a line graph; a minimoremap image containing a pie chart 530 icon 522 in place of a pie chart; a minimoremap image containing a bar graph 532 icon 522 in place of a bar graph; a minimoremap image containing a table 534 icon 522 in place of a table; a minimoremap image containing a table graphic 524 or a proportional table graphic 526 in place of a table; a minimoremap image containing a map 536 icon 522 in place of a map; a minimoremap image containing a video 538 icon 522 or graphic 524 in place of a video or an image 546 from a video; a minimoremap image containing a still image 546 icon 522 or graphic 524 in place of a still image; a minimoremap image containing a source code 312 icon 522 or a source code graphic 524 in place of a source code; a minimoremap image containing a form 540 icon 522 in place of a form; a minimoremap image containing a slider 542 icon 522 in place of a slider; or a minimoremap image containing an error 544 icon 522 in place of an error message 544.

In some embodiments, one or more operations done in one view also change data in the other view. Some embodiments include receiving 710 a notebook interaction command 550, and in response to the notebook interaction command making 712 a first change in a first notebook data 124 which is displayed in one of the views and also making 712 a second change in a second notebook data 124 which is displayed in the other one of the views. In variations, the changed data is not displayed in either view, or is displayed in only one of the views.

In some embodiments, receiving 710 a notebook interaction command includes receiving a main view viewport movement command 604, 550. For example, in one scenario an embodiment moves 222 a viewport in a minimoremap and the main view adjusts accordingly. In another scenario, an embodiment scrolls 222 in the main view and the minimoremap adjusts accordingly. In another scenario, a click on a cell in the minimoremap causes the main view to put the viewport on that cell, e.g., to jump the main view to that location in the notebook 124.

In some embodiments, receiving 710 a notebook interaction command 550 includes receiving at least one of the following commands 550.

A cell order rearrangement command 610, 550. For instance, in some scenarios an embodiment rearranges 608 cells in the minimoremap responsive to the command 610, and also changes cell order accordingly in the main view.

A cell selection command 614, 550. For instance, in some scenarios an embodiment selects 612 cells in the minimoremap in response to clicking on cell(s), or by operation of the context menu 508, e.g., in response to a menu command to "hide non-executable cells". As another example, in some scenarios an embodiment selects 612 cells by applying a selection filter, e.g., when the embodiment is commanded 614 to "show cells containing keyword 'Contoso'" or commanded 614 to "show executable cells that ran without generating error messages" or commanded 614 to "show cells that have an external hyperlink" or commanded 614 to "show cells that have a demo tag" or commanded 614 to "show cells that contain Python code".

A cell visibility command 618, 550. For instance, in some scenarios an embodiment is commanded via the minimoremap to select and then hide cells that have earlier versions of code 312. Sometimes a notebook developer doesn't want to delete certain cells because they have potentially useful content, but also doesn't want the distraction or clutter that would be caused by displaying 706 those cells. In some scenarios an embodiment hides cells in the main view but still shows 708 them in the minimoremap.

A cell execution grouping command 622, 550. For instance, in some scenarios an embodiment is commanded via the minimoremap to select cells and place them in a group 620, so that when any cell in the group is executed all the other cells in that group are also executed. Execution order may be specified by user input in some embodiments. Execution order may be determined in some cases by dependencies 630, and may otherwise be implementation-dependent.

A cell dependency command 632, 550. For instance, in some scenarios an embodiment is commanded to select a cell in the minimoremap, and then uses static analysis to determine all of the cells which the selected cell depends on. In some scenarios, the embodiment also then jumps in the main view 216 to the first of those contributing cells.

An executable cell execution command 624, 550. For instance, in some scenarios an embodiment is commanded to execute 308 cells that are selected in the minimoremap.

A cell collapse command 628, 550. For instance, in some scenarios an embodiment is commanded to select a cell and to collapse the cell to only show a shorter preview of the cell's content.

A merge cells command 636, 550. For instance, in some scenarios an embodiment is commanded to select cells in the minimoremap, and then merges 634 the selected cells into a single cell which has content moved or copied from the selected cells. In some variations, duplicate content is not included twice. In some embodiments, in some scenarios the order of the content in the merged result cell corresponds to the order of the cells prior to the merge. In some other scenarios the order of content in the merged cell is determined by other rules, e.g., chronological order, alphabetical order, or according to a predefined mime type order.

In some embodiments, the method includes obtaining a second minimoremap image of a second cell of the notebook, and the second minimoremap image includes a scaled down image of a main view image of the second cell. That is, some minimoremaps do include a scaled down image of a main view image.

In some embodiments, the method includes selecting 612 a range 552 of cells in the minimoremap view without utilizing a main view navigation control.

In some cases, the selected range includes multiple cells which are not displayed in the main view 216. For instance, in some embodiments user input to the minimoremap view portion of the user interface 212 drives selection of a range 552 of cells, without requiring a user to utilize any main view navigation control such as scrolling, following a hyperlink, moving a vertical slide bar, or pressing a page down button or key or a page up button or key. Thus, the range 552 is selected without forcing the user or the system to change the current focus 820 of the main view 216.

In some embodiments, the minimoremap view includes multiple columns 502, and each of the columns is distinguished 802 from at least one other of the columns in at least one of the following ways: different columns display 708 different respective snapshots 506 of at least a portion of the notebook at different times, or different columns display 708 different execution results 310 of different respective executable cells of the notebook.

In some embodiments, the method includes receiving 816 at least one input 818 which is focused 820 on the minimoremap view as opposed to being focused 820 on the main view, and in response to the at least one input performing 822 at least one of the following commands 550 on the document 124: a cell order rearrangement command 610; a cell selection command 614; a cell visibility command 618; a cell collapse command 628; or a merge cells command 636.

In some embodiments, the method includes receiving 816 at least one input 818 which is focused 820 on the minimoremap view as opposed to being focused 820 on the main view, and in response to the at least one input performing 822 at least one of the following commands 550 on the document 124: a cell execution grouping command 622; a cell dependency command 630; or an executable cell execution command 624.

The listing together of certain commands 550 in one of the preceding two paragraphs, or at other locations in the present disclosure, does not imply that every embodiment supports every listed command 550. A given embodiment may support only one of the listed commands, or support only two of the listed commands, or support only three of the listed commands, and so on, up to embodiments that support all of the listed commands.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as user interface 212 instructions 214, 116, minimoremaps 218, icons 522, graphics 524, proportional graphics 526, context menus 508, rendered images 316, and interaction commands 550 and code 204 which upon execution by a processor 110 performs 822 commands 550, in the form of data 118 and instructions 116, read from a removable storage medium 114 and/or another source such as a network connection, to form a configured storage medium. The configured storage medium 112 is capable of causing a computer system 202 to perform technical process steps for providing or utilizing minimoremap functionality 204, as disclosed herein. The Figures thus help illustrate configured storage media embodiments and process (a.k.a. method) embodiments, as well as system and process embodiments. In particular, any of the process steps illustrated in FIGS. 7 and 8, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system which includes an I/O subsystem (including a display device and an input device) to perform an interaction method on a multicell multicategory document (a "notebook"), the notebook having data which includes at least one executable cell and at least one non-executable cell. This method includes: configuring 702 the I/O subsystem with a user interface, the user interface having a main view and a minimoremap view; obtaining 704 a minimoremap image of a cell of the notebook, the minimoremap image not a scaled down image of a main view image of the cell; displaying 706 less than all of the notebook on the display device in the main view, and simultaneously displaying 708 in the minimoremap view a portion of the notebook which is not displayed in the main view, the displaying 708 in the minimoremap view comprising displaying 708 the minimoremap image of the cell; and receiving 710 a notebook interaction command, and in response to the notebook interaction command making 712 a first change in a first notebook data which is displayed in one of the views and also making 712 a second change in a second notebook data which is displayed in the other one of the views.

In some embodiments, receiving 710 a notebook interaction command includes receiving 710 at least one of the following: a cell order rearrangement command; or a cell selection command.

In some embodiments, receiving 710 a notebook interaction command includes receiving 710 at least one of the following: a cell visibility command; or a cell execution grouping command.

In some embodiments, receiving 710 a notebook interaction command includes receiving 710 at least one of the following: a cell dependency command; or an executable cell execution command.

In some embodiments, receiving 710 a notebook interaction command includes receiving 710 at least one of the following: a cell collapse command; or a merge cells command.

Additional Observations

Additional support for the discussion of minimoremap functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Some embodiments provide or utilize multi-mime-type minimap support, e.g., for a notebook editor 402. A notebook editor is generally an interactive computational environment for creating and manipulating notebook documents. In some scenarios, notebook documents 124 are JSON documents and they contain an ordered list of input/output cells which can contain source code, structured text (markdown), plots and rich media.

A minimap is a miniature map that is sometimes implemented, e.g., in video games and placed at a screen corner to help players orient themselves within the game's world. Some text editors have minimap support, which renders the whole document into a smaller image on the right side of the editor to give a user a high-level overview of the text document.

Notebook documents are richer than normal text files. Notebooks 124 contain an ordered list of input/output cells 302, which include content such as source code, structured text (e.g., markdown) and other mime types (e.g., images, videos, or interactive widgets).

Some embodiments provide or utilize a minimap functionality 204 for notebook documents. A tool 210 equipped with this functionality can render the source code, markdown and media of other mime types in a relatively small portion of the screen, such as at the right side of the notebook editor view. The minimap can help notebook users easily locate where they are in the document 124, or navigate between input or output cells.

In some embodiments, the notebook minimap (a.k.a. herein as "minimoremap") and how it differs from a minimap in some text editors. The notebook minimap can render not only source code, but also rich media of multiple different mime types. The notebook minimap is rendered and updated in an acceptable short time, for both small files and large files. The notebook minimap provides an outline of content in the notebook document by a glance, without scrolling through the whole document 124. The notebook minimap can present live changes on the notebook document, for example, showing the cell execution and content changes even when they are out of the main viewport. The minimap can help notebook users easily locate where they are in the document 124, or navigate between input cells or output cells.

Jupyter® notebooks 124 utilize a popular file format across industries such as education, data science, data engineering, and others (mark of NumFOCUS, Inc.). In some embodiments, an Azure® notebooks component provides an embeddable, easy-to-use notebooks experience with a variety of features and an extensible interface. In some scenarios, a notebooks component enables multiple public-facing products to easily offer a consistent yet differentiated (as desired) notebooks experience across a varied collection of products and services.

In particular, a notebooks canvas may provide a way to view, edit, and run Jupyter® notebooks 124. Jupyter® notebooks 124 provide an interactive interface to combine markdown text, images, and other textual or non-textual content alongside executable code and visualizations. In some embodiments, an Azure® notebooks component builds on top of the Jupyter® project as well as an nteract™ experience for notebooks (nteract is a mark of Naranga, LLC). One such component includes a JavaScript® bundle to be shipped via a content delivery network (CDN) (mark of Oracle America, Inc.). Partners can embed this bundle into their experience to render notebooks with the notebooks component by providing a pointer a notebook file. To add the ability to run a notebook, partners can provide a compute target to execute any code contained in the notebook 124. Some notebook offerings utilize a Jupyter® stack. Azure® notebooks abstracts away details of interacting with compute and kernels for the viewing and the editing of a notebook, providing simplicity and cost reduction to hosts or vendor partners. The notebook component further provides flexibility with its ability to utilize a variety of storage offerings when a pointer to a notebook file (.ipynb) is supplied.

One suitable implementation environment for at least some of the teachings provided herein is a Microsoft Azure® cloud environment 100, enhanced by an Azure® notebooks component as a global service which is available to be hosted by a product running in any Azure® region, even though the Azure® notebooks service might not have a copy (e.g., an Azure® stamp) physically present in every region (mark of Microsoft Corporation). This notebooks service may be architected with an Azure Cosmos DB® database and multi-region deployments to maintain great performance, high availability, and resiliency (mark of Microsoft Corporation). The Azure® notebooks component may leverage the storage of the host product so that notebooks 124 and other files can be consumed and managed together. Not storing customer content enables Azure® notebooks to be offered as a globally scoped service in each Azure® cloud. As a global service the Azure® notebooks component can be hosted by any global, geographic, or regionally scoped product and implemented to meet compliance requirements.

Although Azure® offerings are discussed herein as examples, one of skill will understand that the teachings presented here may be ported, adapted, or otherwise applied to offerings in other environments and to offerings from vendors other than Microsoft Corporation.

In some scenarios, the notebook documents 124 are JSON documents that contain an ordered list of input/output cells 302 which can contain source code, structured text 516 (e.g., markdown), plots such as graphs and charts, and rich media such as HTML (hypertext markup language) and JavaScript®-based interactive graphs (mark of Oracle America, Inc.).

One alternative to the embodiments herein is a non-enhanced tool 122, that is, a notebook tool which lacks any minimoremap functionality 204. This alternative lacks the benefits discussed herein of coordination between the minimoremap view and the main view, e.g., to use the minimoremap view for navigation. Another alternative to some of the embodiments herein is minimap-only functionality in a tool 210, so the tool lacks most of the notebook cell 302 operations of a minimoremap. This alternative lacks the benefits discussed herein of minimoremap functionality 204 for easy and efficient cell selection 612, and for cell commands to perform rearrangement 608, visibility changes 616, execution grouping 620, collapse 626, merge 634, and dependency 630 checks.

It is expected that an embodiment will often run on a single device 101, since many of the teachings herein are most evident in the user interface 212 innovations. However, in some embodiments, computation-heavy aspects such as cell execution 308 or image rendering 810 are outsourced to other machines. In some embodiments, a user interface 212 spans multiple machines 101.

Technical Character

The technical character of embodiments described herein will be apparent to one of ordinary skill in the art, and will also be apparent in several ways to a wide range of attentive readers. Some embodiments address technical activities such as executing 308 notebook 124 cells 306, rendering 810 images 316, editing 608, 612, 616, 620, 626, 634 notebook 124 cells 302, and displaying 706, 708 data 118 on a display 126, which are each an activity deeply rooted in computing technology. Some of the technical mechanisms discussed include, e.g., enhanced notebook viewing tools 404, enhanced notebook editing tools 402, viewports 602, minimoremaps 218, image renderers 510, 808, tool user interfaces 212, configurable displays 126, other peripherals 106, and I/O subsystems 206. Some of the technical effects discussed include, e.g., coordinated data changes 712 in a main view 216 and a minimoremap view 220, simultaneous displays 706 and 708 of a main view 216 and a multicolumn 502 minimoremap view 220, maintained focus 820 in a main view 216 despite performance 822 of commands 550 entered in a minimoremap view 220, and easier user access to cells 302 from different perspectives. Thus, purely mental processes and activities limited to pen-and-paper are clearly excluded. Other advantages based on the technical characteristics of the teachings will also be apparent to one of skill from the description provided.

Different embodiments provide different technical benefits or other advantages in different circumstances, but one of skill informed by the teachings herein will acknowledge that particular technical advantages will likely follow from particular innovation features or feature combinations, as noted at various points herein.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to provide a notebook editor 402 with a document overview functionality similar to a minimap document overview functionality, and how to improve the usability, accuracy, efficiency, and scope of interaction operations on notebook cells 302. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.
- ALU: arithmetic and logic unit
- API: application program interface
- BIOS: basic input/output system
- CD: compact disc
- CPU: central processing unit
- DVD: digital versatile disk or digital video disc
- FPGA: field-programmable gate array
- FPU: floating point processing unit
- GDPR: General Data Protection Regulation
- GPU: graphical processing unit
- GUI: graphical user interface
- HTTPS: hypertext transfer protocol, secure
- IaaS or IAAS: infrastructure-as-a-service
- ID: identification or identity
- JSON: JavaScript® Object Notation (mark of Oracle America, Inc.)
- LAN: local area network
- OS: operating system
- PaaS or PAAS: platform-as-a-service
- RAM: random access memory
- ROM: read only memory
- TPU: tensor processing unit
- UEFI: Unified Extensible Firmware Interface
- UI: user interface
- WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Minimoremap operations such as matching a cell mime type 314 to an icon 522 or a graphic 524, selecting 612 a range 552 of notebook cells 302, collapsing 626 a cell 302, merging 634 cells 302, and many other operations discussed herein, are understood to be inherently digital. A human mind cannot interface directly with a CPU or other processor, or with RAM or other digital storage, to read and write the necessary data to perform the minimoremap-based notebook 124 interaction steps 800 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as analyzing, changing, collapsing, configuring, displaying, distinguishing, editing, executing, grouping, hiding, highlighting, implementing, matching, merging, navigating, obtaining, performing, rearranging, receiving, rendering, scaling, selecting, showing, viewing (and analyzes, analyzed, changes, changed, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment; includes one or more systems 102
  - 101 machine in a system 102, e.g., any device having at least a processor 110 and a memory 112 and also having a distinct identifier such as an IP address or a MAC (media access control) address; may be a physical machine or be a virtual machine implemented on physical hardware
  - 102 computer system, also referred to as a "computational system" or "computing system", and when in a network may be referred to as a "node"
  - 104 users, e.g., user of an enhanced system 202
  - 106 peripheral device
  - 108 network generally, including, e.g., LANs, WANs, software-defined networks, clouds, and other wired or wireless networks
  - 110 processor; includes hardware
  - 112 computer-readable storage medium, e.g., RAM, hard disks
  - 114 removable configured computer-readable storage medium
  - 116 instructions executable with processor; may be on removable storage media or in other memory (volatile or nonvolatile or both)
  - 118 digital data in a system 102; data structures, values, source code 312, mime types 314, images 316, commands 550, cell 302 content, and other examples are discussed herein
  - 120 kernel(s), e.g., operating system(s), BIOS, UEFI, device drivers
  - 122 tools and applications, e.g., version control systems, cybersecurity tools, software development tools, office productivity tools, social media tools, diagnostics, editors, viewers, browsers, games, email and other communication tools, and so on; services are an example of tools
  - 124 notebook, e.g., JSON document containing an ordered list of cells which can contain script code, markdown text, or rich media (e.g., HTML or JavaScript®-based interactive graphs) (mark of Oracle America, Inc.), for example; some examples of rich media used in notebooks are HTML or JavaScript®-based interactive graphs (mark of Oracle America, Inc.); many familiar software tools, open standards, and interactive programming services for notebooks are the results of Project Jupyter® efforts (mark of NumFOCUS, Inc.); reference numeral 124 refers to a notebook as a whole or to data 118 which is part of a notebook, or both, according to context; computational and digital
  - 126 display screens, also referred to as "displays"
  - 128 computing hardware not otherwise associated with a reference number 106, 108, 110, 112, 114
  - 130 cloud, also referred to as cloud environment or cloud computing environment
  - 202 enhanced computing system, i.e., system 102 enhanced with minimoremap functionality as taught herein
  - 204 minimoremap functionality, e.g., software or specialized hardware which performs or is configured to perform step 702, or steps 704 and 706 and 708, or steps 710 and 712, or any software or hardware which performs or is configured to perform a novel method 800 or a computational minimoremap activity first disclosed herein
  - 206 I/O subsystem of a system 102; I/O means input/output
  - 208 input device, e.g., keyboard, mouse, trackpad, touch screen, electronic pen, microphone, or camera
  - 210 notebook tool, e.g., a tool 122 which reads, writes, or executes cell(s) 302; software or special-purpose hardware or both
  - 212 user interface; software
  - 214 instructions 116 implementing user interface software
  - 216 main view in a tool user interface
  - 218 minimoremap, e.g., a displayed portion of a minimoremap functionality 204
  - 220 minimoremap view in a tool user interface; usually but not necessarily always superimposed over the main view 216; position is adjustable in some embodiments
  - 222 navigation operation, e.g., a computational operation which moves a user interface focus, changes which data 124 is displayed in a viewport, opens a notebook for viewing or editing or both, or closes a notebook; navigation is effected proactively by a tool or other software, or in response to a command from an input device
  - 302 cell of a notebook 124; computational or digital or both
  - 304 non-executable cell 302, e.g., cell containing only natural language text or a still image or both
  - 306 executable cell 302, e.g., cell containing source code for a script, or HTML text, or a hyperlink, or a widget such as a slider or button, or a combination of the foregoing
  - 308 computational activity of executing software
  - 310 digital result of execution 308, e.g., output image or output text, or both, or a value for subsequent use as an input to another cell's execution
  - 312 source code; digital
  - 314 mime type; as used herein refers to a digital value which
- represents or characterizes cell 302 content type or kind; some examples of mime types include a media type value such as "image/jpeg" or "text/plain", and a file extension such as ".py" or ".mp4"
  - 316 digital image; may be a photographic image, or a computer-generated image, or an icon 522, or a graphic 524 or 526, or a graph 528 or 532, or a map 536, or text 516 in a font, or another result 310 of rendering 810, or a combination (e.g., composition, montage, collage, etc.) of any of the foregoing; digital
  - 402 notebook editor or computational activity of editing a notebook; a tool 210 which allows a user to control edits to a cell 302 or a sequence of cells 302; an editor 402 includes a viewer 404 plus editing functionality 404 notebook viewer or computational activity of viewing a notebook; a tool 210 which allows a user to view a cell 302 or a sequence of cells 302, but does not have editing functionality 502 column in a minimoremap; it is expected that minimoremaps will be oriented vertically in most embodiments, but a horizontal orientation is also possible, in which case the term "column" refers to a row in a multi-row minimoremap 504 portion (less than all) of a notebook 124

506 snapshot of notebook (portion or all) content at a point in time 508 computational result of execution 308

510 renderer generally; computational 512 render architecture in a system 202, e.g., a description or an implementation of a division of rendering activity between different parts of the system 514 scaled-down image; digital 516 text generally, as represented in a system 202

518 rectangle visual element in a system 202

520 line segment visual element in a system 202

522 icon visual element in a system 202

524 graphic visual element in a system 202

526 proportional graphic visual element in a system 202

528 line graph, as represented in a system 202

530 pie chart, as represented in a system 202

532 bar graph, as represented in a system 202

534 table, as represented in a system 202

536 map, as represented in a system 202

538 video, as represented in a system 202

540 fillable form, as represented in a system 202

542 slider control, as represented in a system 202

544 error(s) or textual description thereof, as represented in a system 202

546 still image, as represented in a system 202

548 cell 302 content generally, as represented in a system 202

550 human-computer interaction command, as represented in a system 202

552 range of cells 302, as represented in a system 202

554 syntax highlighting of source code 312, as represented in a system 202

602 viewport of a view 216 or 220 in a user interface 604 command 550 to move a viewport relative to a notebook (or conceptually equivalent, to move the notebook relative to the viewport)

606 order of cells in a notebook, e.g., from top/first cell to bottom/last cell, as represented in a system 202

608 change in order 606

610 command 550 to change order 606

612 selection of cells 302, as represented in a system 202; may be one cell, or a range 552 of cells, or a set of cells that are not all in a single range; 612 also refers to the computational activity of making a selection, i.e., selecting one or more cells 302

614 command 550 to make or change a selection 612

616 cell visibility, as represented in a system 202, that is, whether the cell is displayed when it is within the scope of a viewport 618 command 550 to change visibility 616 of one or more cells 620 group of cells, as represented in a system 202, or computational activity of grouping cells, especially for execution together 622 command 550 to make or change a group 620

624 command 550 to execute 308 a cell, e.g., to submit a script that is content of the cell to an interpreter 626 collapse of a cell, e.g., a shortened version or a preview of a cell's contents; 626 also refers to the computational activity of making a cell's collapse 628 command 550 to collapse 626 one or more cells 630 execution dependency relationship between two or more cells, as implemented or represented in a system 202; 630 also refers to computational activity of determining presence or extent of a dependency, e.g., by static analysis 632 command 550 to compute a dependency 630, or display a previously computed representation of the dependency, or both 634 computational activity of merging contents of two or more cells into a smaller number of cells, or a result of such activity in a system 202

636 command 550 to merge 634 cells 700 flowchart; 700 also refers to notebook interaction methods (a.k.a. "notebook operations methods", or "minimoremap methods") that are illustrated by or consistent with the FIG. 7 flowchart 702 computationally configure a user interface 212 with a main view 216 and a minimoremap view 220 so they are displayed concurrently, e.g., using user interface API(s)

704 computationally obtain a cell's minimoremap image, e.g., from a renderer 510 API or by rendering 810

706 computationally display data in a main view 216, e.g., using an API or by writing to display 126 memory 112 or both 708 computationally display data in a minimoremap view 220, e.g., using an API or by writing to display 126 memory 112 or both 710 computationally receive an interaction command 550, e.g., from a user interface 212 API, 712 computationally make a change in a notebook 124, e.g., as directed by a command 550

800 flowchart; 800 also refers to minimoremap methods that are illustrated by or consistent with the FIG. 8 flowchart, which incorporates the FIG. 7 flowchart and other steps taught herein 802 computationally distinguish different columns 502, e.g., by utilizing different data as a basis for rendering the images 316 of one column than is used as the basis for rendering the images 316 of another column 804 computationally configure a context menu 508 in a minimoremap view, e.g., by using a user interface 212 API 806 computationally implement a pluggable renderer 808, e.g., as part of an IDE extension, or a plug-in 808 pluggable renderer software 810 computationally render an image, e.g., by matching cell content to an icon or a graphic (to render a minimoremap view image), or by executing a cell or invoking a built-in tool renderer or an extension renderer (to render a main view image), or by scaling down a full-size image (to render a minimoremap view image), and then outputting the resulting image 812 computationally obtain an icon or a graphic as a substitute for a scaled-down image, e.g., from a renderer 814 computationally display a substitute for a scaled-down image, e.g., an icon or a graphic or a rendering progress indicator or a "image not available" notice or a generic visual for any kind of cell 302

816 computationally receive an input 818 via an input device 208

818 input 818 from an input device 208, as represented in a system 202

820 focus of a view 216 or a view 220, as represented in a system 202, or the computational activity of selecting or changing such a focus, e.g., current position of an insertion point for editing, current relative position of viewport and notebook, current selection, e.g., for cut or move operation, or a combination thereof 822 computationally perform a command 550

824 any step or item discussed in the present disclosure that has not been assigned some other reference numeral; 824 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments provide a notebook tool 210 enhanced with minimoremap functionality 204. Notebooks 124 are multicell documents with varied mime types 314 present in the content 548 of various cells 302 of a given notebook, including executable source code 312 such as scripts, non-executable content 304, markdown text 516, natural language text 516, photos 546, videos 538, maps 536, and more. The enhanced notebook tool 210 includes a main view 216 and a minimoremap view 220 which is functionally coordinated with the main view, e.g., for navigation 222 and cell selection 612. Notebook cell operations 800 are commanded 710, 550 via the minimoremap 218. Cells 302 outside the main view 216 viewport 602 are modified 712 without changing the user interface 212 main view 216 focus 820. Tool-human interaction commands 550 cause the performance 822 of notebook operations 800 such as cell execution 308, cell rearrangement 608, cell collapse 626, cells merge 634, cells grouping 620, or cell dependency analysis 630. Minimoremap cell images 316 are rendered 810 as icons 522, as graphics 524 or 526, or as scaled-down versions 514 of previously rendered full-size main view 216 images 316.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system which is equipped to perform operations on a multicell multicategory document (a "notebook"), the notebook having data which includes at least one executable cell and at least one non-executable cell, the computing system comprising:
    a digital memory;
    a processor in operable communication with the digital memory;
    an input/output subsystem including a display device and an input device; and a notebook tool having user interface instructions which upon execution by the processor configure the input/output subsystem with a user interface, the user interface having a main view displaying the at least one executable cell and displaying the at least one non-executable cell, the user interface also having a minimoremap view, obtain a first minimoremap image which is an image of an executable cell of the notebook, the first minimoremap image not a scaled down image of a main view image of the executable cell, obtain a second minimoremap image which is an image of a non- executable cell of the notebook;
    the notebook and the notebook tool being further characterized such that when the notebook is loaded into the notebook tool less than all of the notebook is displayed on the display device in the main view, a portion of the notebook which is not displayed in the main view is simultaneously displayed on the display device in the minimoremap view, the displaying in the minimoremap view comprising displaying the first minimoremap image of the executable cell and displaying the second minimoremap image of the non-executable cell, receiving a notebook interaction command, and in response to the notebook interaction command making a first change in a first notebook data which is displayed in one of the main view and the minimoremap view and also making a second change in a second notebook data which is displayed in the other one of the main view and the minimoremap view.

2. The computing system of claim 1, wherein the notebook tool comprises at least one of:
    a notebook editor which supports editing a source code of the executable cell, executing the executable cell, and displaying a result of executing the executable cell; or
    a notebook viewer which supports executing the executable cell and displaying a result of executing the executable cell.

3. The computing system of claim 1, wherein the minimoremap view comprises multiple columns, and each of the columns is distinguished from at least one other of the columns in at least one of the following ways:
    different columns display different respective portions of the notebook;
    different columns display different respective snapshots of at least a portion of the notebook at different times; or
    different columns display different execution results of different respective executable cells of the notebook.

4. The computing system of claim 1, wherein the user interface instructions further comprise minimoremap context menu instructions which upon execution by the processor configure the user interface with a context menu as a part of the minimoremap view.

5. The computing system of claim 1, wherein the user interface instructions upon execution implement at least one of the following render architectures:
for a given cell of a given mime type, a pluggable renderer for the mime type renders a main view image of the given cell for the main view and the same pluggable renderer also renders a corresponding minimoremap image of the given cell for the minimoremap view, or
for a given cell of a given mime type, a pluggable renderer for the mime type renders a main view image of the given cell for the main view but does not render a corresponding minimoremap image, and a separate minimoremap renderer renders the corresponding minimoremap image of the given cell for the minimoremap view.

6. The computing system of claim 1, wherein at least one of the first minimoremap image and the second minimoremap image comprises at least one of the following:
a rectangle in place of a text;
a line segment in place of a text; or
a source code icon or a source code graphic in place of a source code.

7. An interaction method to perform operations on a multicell multicategory document (a "notebook"), the notebook having data which includes at least one executable cell and at least one non-executable cell, the method performed by a computing system which includes an input/output subsystem including a display device and an input device, the method comprising:
configuring the input/output subsystem with a user interface, the user interface having a main view displaying the at least one executable cell and displaying the at least one non-executable cell, the user interface also having a minimoremap view of a minimoremap;
obtaining a minimoremap image of a cell of the notebook;
displaying less than all of the notebook on the display device in the main view, and simultaneously displaying in the minimoremap view a portion of the notebook which is not displayed in the main view, the displaying in the minimoremap view comprising displaying the minimoremap image of the cell;
receiving a notebook interaction command via the minimoremap, the received notebook interaction command not limited to navigation; and
in response to receiving the notebook interaction command, making a change in at least one cell of the notebook or making a change in a set of cells of the notebook, or both;
wherein obtaining the minimoremap image comprises obtaining at least one of the following:
a minimoremap image containing a rectangle in place of a source code text and also containing a syntax highlighting;
a minimoremap image containing a line segment in place of a source code text and also containing a syntax highlighting;
a minimoremap image containing a line graph icon in place of a line graph;
a minimoremap image containing a pie chart icon in place of a pie chart;
a minimoremap image containing a bar graph icon in place of a bar graph;
a minimoremap image containing a table icon in place of a table;
a minimoremap image containing a table graphic or a proportional table graphic in place of a table;
a minimoremap image containing a map icon in place of a map;
a minimoremap image containing a video icon or graphic in place of a video or an image from a video;
a minimoremap image containing a still image icon or graphic in place of a still image;
a minimoremap image containing a form icon in place of a form;
a minimoremap image containing a slider icon in place of a slider; or
a minimoremap image containing an error icon in place of an error message.

8. The method of claim 7, wherein the method comprises, in response to receiving the notebook interaction command, moving a viewport in the minimoremap view and adjusting the main view accordingly.

9. The method of claim 7, further comprising receiving a main view viewport movement command and updating the main view and the minimoremap view according to the main view viewport movement command.

10. The method of claim 7, wherein the minimoremap view is superimposed over the main view.

11. The method of claim 7, further comprising obtaining a second minimoremap image of a second cell of the notebook, the second minimoremap image including a scaled down image of a main view image of the second cell.

12. The method of claim 7, further comprising selecting a range of cells in the minimoremap view without utilizing a main view navigation control, the selected range including multiple cells which are not displayed in the main view.

13. The method of claim 7, wherein the minimoremap view comprises multiple columns, and each of the columns is distinguished from at least one other of the columns in at least one of the following ways:
different columns display different respective snapshots of at least a portion of the notebook at different times; or
different columns display different execution results of different respective executable cells of the notebook.

14. The method of claim 7, comprising receiving at least one input which is focused on the minimoremap view as opposed to being focused on the main view, and in response to the at least one input performing at least one of the following commands on the document:
a cell order rearrangement command;
a cell visibility command;
a cell collapse command; or
a merge cells command.

15. The method of claim 7, comprising receiving at least one input which is focused on the minimoremap view as opposed to being focused on the main view, and in response to the at least one input performing at least one of the following commands on the document:
a cell execution grouping command;
a cell dependency command; or
an executable cell execution command.

16. A computer-readable storage device configured with data and instructions which upon execution by a processor cause a computing system which includes an I/O subsystem including a display device and an input device to perform an interaction method on a multicell multicategory document (a "notebook"), the notebook having data which includes at least one executable cell and at least one non-executable cell, the method comprising:
- configuring the I/O subsystem with a user interface, the user interface having a main view and a minimoremap view;
- obtaining a first minimoremap image which is an image of an executable cell of the notebook, the minimoremap image not a scaled down image of a main view image of the executable cell;
- obtaining a second minimoremap image which is an image of a non-executable cell of the notebook;
- displaying less than all of the notebook on the display device in the main view, and simultaneously displaying in the minimoremap view a portion of the notebook which is not displayed in the main view, the displaying in the minimoremap view comprising displaying the minimoremap image of the executable cell and displaying the minimoremap image of the non- executable cell; and
- receiving a notebook interaction command, and in response to the notebook interaction command making a first change in a first notebook data which is displayed in one of the views and also making a second change in a second notebook data which is displayed in the other one of the views.

17. The computer-readable storage device of claim 16, wherein receiving a notebook interaction command comprises receiving at least one of the following:
- a cell order rearrangement command; or
- a cell selection command.

18. The computer-readable storage device of claim 16, wherein receiving a notebook interaction command comprises receiving at least one of the following:
- a cell visibility command; or
- a cell execution grouping command.

19. The computer-readable storage device of claim 16, wherein receiving a notebook interaction command comprises receiving at least one of the following:
- a cell dependency command; or
- an executable cell execution command.

20. The computer-readable storage device of claim 16, wherein receiving a notebook interaction command comprises receiving at least one of the following:
- a cell collapse command; or
- a merge cells command.

* * * * *